United States Patent
Akoum et al.

(10) Patent No.: US 10,594,379 B2
(45) Date of Patent: *Mar. 17, 2020

(54) FACILITATING AN ENHANCED RESOURCE INDICATOR FOR CHANNEL STATE REPORTING IN A WIRELESS COMMUNICATION SYSTEM

(71) Applicant: AT&T Intellectual Property I, L.P., Atlanta, GA (US)

(72) Inventors: Salam Akoum, Austin, TX (US); Xiaoyi Wang, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/958,073

(22) Filed: Apr. 20, 2018

(65) Prior Publication Data

US 2018/0248608 A1 Aug. 30, 2018

Related U.S. Application Data

(63) Continuation of application No. 15/418,374, filed on Jan. 27, 2017, now Pat. No. 9,979,456.

(51) Int. Cl.
*H04W 4/00* (2018.01)
*H04B 7/06* (2006.01)
(Continued)

(52) U.S. Cl.
CPC ........... *H04B 7/0626* (2013.01); *H04B 7/024* (2013.01); *H04B 7/0413* (2013.01);
(Continued)

(58) Field of Classification Search
None
See application file for complete search history.

(56) References Cited

U.S. PATENT DOCUMENTS 8,195,184 B2 6/2012 Kent et al.
8,644,422 B2 2/2014 Gao et al.
(Continued)

FOREIGN PATENT DOCUMENTS

WO 2016/140603 A1 9/2016

OTHER PUBLICATIONS

Notice of Allowance received for U.S. Appl. No. 15/418,374 dated Jan. 23, 2018, 26 pages.
(Continued)

*Primary Examiner* — Elisabeth Benoit Magloire
(74) *Attorney, Agent, or Firm* — Amin, Turocy & Watson, LLP

(57) ABSTRACT

An enhanced resource indicator for channel state reporting for a wireless communication system is provided. In one example, a method comprises: obtaining, by a device comprising a processor, selected signal information and selected interference information from signal information and interference information, to transmit to a base station device of base station devices as part of a channel state information report sent to the base station device and responsive to resource signals received from the base station devices, wherein the selected signal information and the selected interference information are indicated in the channel state information report by a first index and a second index, respectively; and transmitting, by the device, the channel state information report to the base station device.

20 Claims, 10 Drawing Sheets

(51) Int. Cl.
*H04L 5/00* (2006.01)
*H04B 7/024* (2017.01)
*H04W 72/04* (2009.01)
*H04B 7/0456* (2017.01)
*H04B 17/336* (2015.01)
*H04B 7/0413* (2017.01)

(52) U.S. Cl.
CPC ......... *H04B 7/0456* (2013.01); *H04B 7/0632* (2013.01); *H04B 7/0639* (2013.01); *H04B 17/336* (2015.01); *H04L 5/0048* (2013.01); *H04W 72/042* (2013.01)

(56) References Cited

U.S. PATENT DOCUMENTS

| | | | |
|---|---|---|---|
| 8,711,716 B2 | 4/2014 | Chen et al. | |
| 8,761,790 B2 | 6/2014 | Kent et al. | |
| 9,179,332 B2 | 11/2015 | Hammarwall et al. | |
| 9,294,310 B2 | 3/2016 | Wu et al. | |
| 10,070,333 B2 * | 9/2018 | Li | H04L 5/0035 |
| 2009/0109939 A1 * | 4/2009 | Bhushan | H04W 72/082 370/337 |
| 2013/0155973 A1 | 6/2013 | Geirhofer et al. | |
| 2013/0258886 A1 * | 10/2013 | Chen | H04B 7/0417 370/252 |
| 2013/0273931 A1 | 10/2013 | Lunttila et al. | |
| 2013/0286884 A1 * | 10/2013 | Li | H04L 1/0026 370/252 |
| 2013/0301450 A1 | 11/2013 | Geirhofer et al. | |
| 2015/0208263 A1 | 7/2015 | Behravan et al. | |
| 2016/0013900 A1 | 1/2016 | Lee et al. | |
| 2016/0072568 A1 * | 3/2016 | Mun | H04L 1/0026 375/267 |
| 2016/0080064 A1 | 3/2016 | Kim et al. | |
| 2016/0142189 A1 | 5/2016 | Shin et al. | |
| 2016/0197662 A1 | 7/2016 | Wu et al. | |
| 2016/0269084 A1 | 9/2016 | Nam et al. | |
| 2016/0329945 A1 | 11/2016 | Onggosanusi et al. | |
| 2016/0352401 A1 | 12/2016 | Yu et al. | |
| 2017/0310441 A1 | 10/2017 | Wei et al. | |
| 2017/0331535 A1 | 11/2017 | Wei et al. | |
| 2019/0013881 A1 * | 1/2019 | Olesen | H04B 17/318 |

OTHER PUBLICATIONS

Lim et al., "Recent Trend of Multiuser MIMO in LTE-Advanced," IEEE Communications Magazine, 2013, pp. 127-135, vol. 51, No. 3, 20 pages.

* cited by examiner

FACILITATING AN ENHANCED RESOURCE INDICATOR FOR CHANNEL STATE REPORTING IN A WIRELESS COMMUNICATION SYSTEM

RELATED APPLICATION

The subject patent application is a continuation of, and claims priority to, U.S. patent application Ser. No. 15/418,374, filed Jan. 27, 2017, and entitled "FACILITATING AN ENHANCED RESOURCE INDICATOR FOR CHANNEL STATE REPORTING IN A WIRELESS COMMUNICATION SYSTEM," the entirety of which application is hereby incorporated by reference herein.

TECHNICAL FIELD

The subject disclosure relates generally to communications systems, and, for example, to systems, methods and/or machine-readable storage media for facilitating an enhanced resource indicator for channel state reporting for a wireless communication system.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

DETAILED DESCRIPTION

Figure 1:
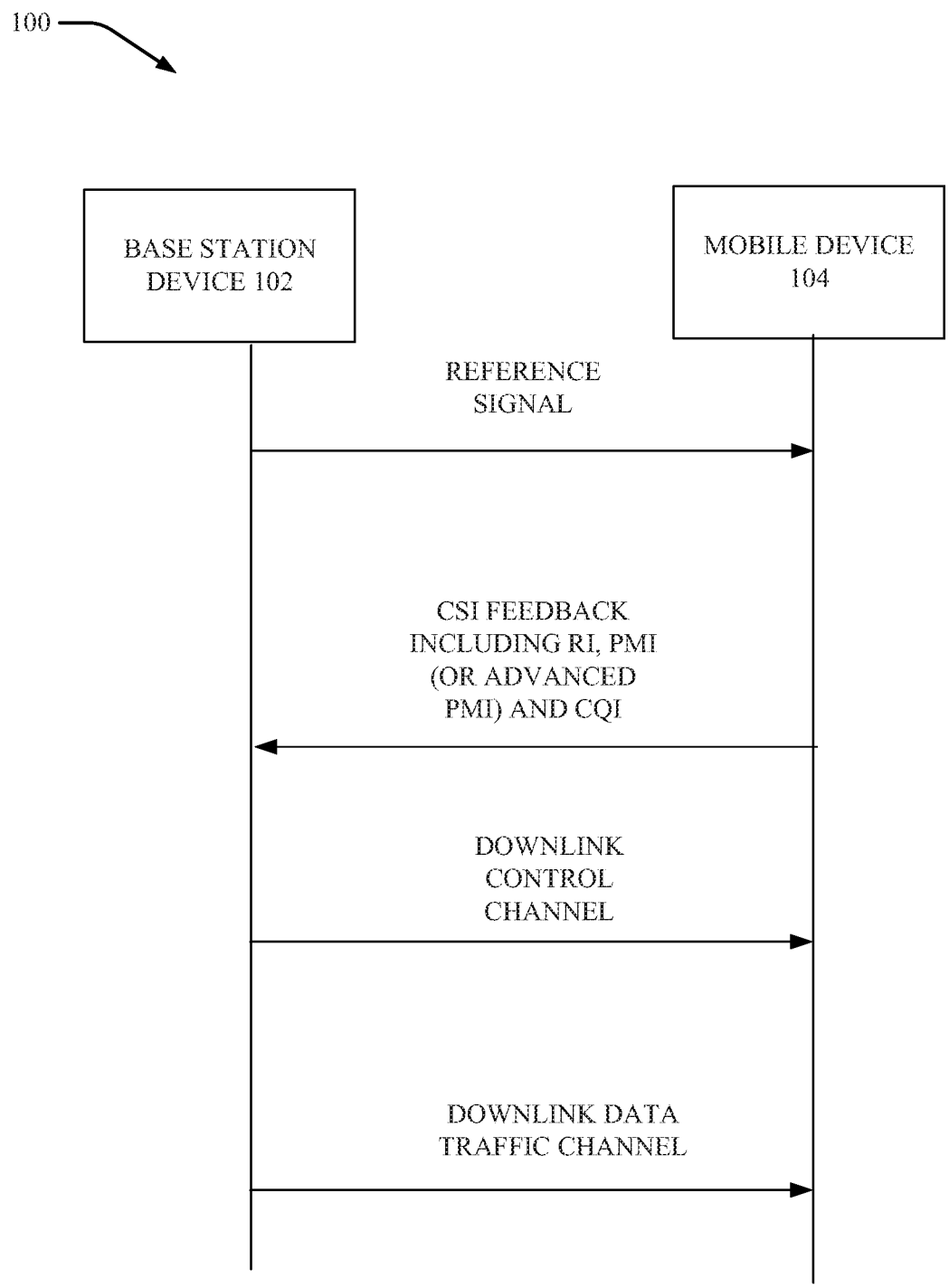
FIG. 1 illustrates an example, non-limiting message sequence flow chart to facilitate an enhanced resource indictor for channel state reporting in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)," "gNB" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

To meet the huge demand for data centric applications, currently 3GPP is looking towards extending the current 4G standards to 5G. However, there are numerous challenges and/or issues that are expected to arise. As used herein, "5G" can also be referred to as New Radio (NR) access. One or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE. Typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

Systems, methods and/or machine-readable storage media for facilitating an enhanced resource indicator for channel state reporting for 5G systems are provided herein. In one embodiment, an apparatus is provided. The apparatus can comprise: a processor; and a memory that stores executable instructions that, when executed by the processor, facilitate performance of operations. The operations can comprise: measuring resources associated with a group of base station devices; selecting a subgroup of resources of the resources, wherein the subgroup of resources comprises: first information indicative of a beam transmission associated with a first base station device of the group of base station devices and corresponding to a first index; and second information indicative of an interfering beam transmission associated with a second base station device of the group of base station devices and corresponding to a second index. The operations can also comprise generating report data representative of a report, comprising the first index and the second index represented within the subgroup of resources, for transmission to at least the first base station device of the group of base station devices, wherein the report data is generated for transmission to the first base station device.

In another embodiment, a machine-readable storage medium, comprising executable instructions that, when executed by a processor, facilitate performance of operations is provided. The operations can comprise: measuring signals associated with a group of base station devices; identifying a first subgroup of signals of the signals associated with strongest ones of the signals, wherein the first subgroup is indicated by a first group of indexes; identifying a second subgroup of signals of the signals associated with strongest interfering ones of the signals, wherein the second subgroup is indicated by a second group of indexes; and generating channel state information reference signal resource indicator report data comprising the first group of indexes and the second group of indexes for transmission to at least a base station device of the group of base station devices, and wherein channel state information reference signal resource indicator report data is configured to be transmitted from the base station device to a network controller communicatively coupled to the group of base station devices.

In another embodiment, a method is provided. The method can comprise: obtaining, by a device comprising a processor, selected signal information and selected interference information from signal information and interference information, to transmit to a base station device of base station devices as part of a channel state information report sent to the base station device and responsive to resource signals received from the base station devices, wherein the selected signal information and the selected interference information are indicated in the channel state information report by a first index and a second index, respectively; and transmitting, by the device, the channel state information report to the base station device.

FIG. 1 illustrates an example, non-limiting message sequence flow chart to facilitate an enhanced resource indictor for channel state reporting in a system (e.g., system 100) in accordance with one or more embodiments described herein. While the system 100 shows a single BS device 102, in various embodiments, multiple BS devices are included in system 100 such as that shown in FIG. 2. All such embodiments are envisaged.

One or more embodiments of the system 100 described herein can provide an enhanced resource indication framework allowing the mobile device 104 to select channel properties and interference channel properties and/or indicate one or more of these selected channel or properties or interference properties in a report to the network (not shown) in a configurable manner. In some embodiments, the report is provided to BS device 102 directly from the mobile device 104 for communication to the network. Via the report, one or more embodiments can generalize a resource indicator (e.g., LTE or other resource indicator) to a generic resource indicator, which can indicate desired and/or interfering signals indexes jointly with a flexible PMI and CQI report.

The ability for the mobile device 102 to combine the interference measurements and the channel properties measurements in one channel state report that indicates the preferred transmission from a selected BS device, and giving the flexibility to the mobile device 104 to choose one or more (or, in some embodiments, multiple) resources to report on in the CSI report according to its measured channel and interference is provided via one or more embodiments described herein.

With reference to FIG. 1, one or more of reference signals and/or pilot signals can be transmitted within the system 100. The reference signals and/or the pilot signals can be beamformed or non-beamformed. The mobile device 104 can measure the channel response and determine the channel state information (CSI) for feedback to the BS device 102. The CSI report can be sent via the feedback as shown in FIG. 1. The CSI report can comprise, for example channel quality indicator (CQI), preceding matrix index (PMI), advanced PMI information, rank information (RI), the best subband indexes, best beam indexes etc. or any number of other types of information.

RI can be used to indicate the rank of CSI feedback, PMI can be employed to indicate the index of a selected precoder in a codebook stored at or accessible by the mobile device 102 and the BS device 104 (or any BS device selected by mobile device 104 for downlink transmission), CQI can be employed to indicate the channel quality for link adaptaion from the network, and the channel state information—reference signal (CSI-RS) resource indicator (CRI) can be employed in full dimensional schemes to indicate the beam preference of the mobile device 104 in the case when the mobile device 104 is monitoring multiple beams from different BS devices. In the embodiments described herein, the mobile device 104 can monitor one or more beams transmitted from one or more respective BS devices. While BS device 104 is shown in FIG. 1, in other embodiments, multiple BS devices can transmit respective reference signals or pilot signals that can be measured by the mobile device 104.

In various embodiments described herein, the mobile device 104 can report back one or more selected beams and/or one or more interfering beams (which emanate from one or more BS devices of the one or more BS devices transmitting beams having the reference signals and/or the pilot signals) in CRI as the CSI feedback shown in FIG. 1. The selected beams can be those that the mobile device 104 prefers for transmission with the mobile device while the interfering beams can be those that the mobile device 104 is providing notification for that there is interference emanating from being detected by the mobile device 104. In some embodiments, the interfering signal can be determined by the mobile device 104 based on the interfering level corresponding to the transmission activity in neighboring BS devices relative to the BS devices selected by the mobile device 104 for transmission.

The mobile device 104 can select the one or more beams as the one or more beams received by the mobile device 104 having the strongest signal (or signals). The mobile device 104 can also identify one or more interfering beams from one or more BS devices providing signals. The mobile device 104 can select the one or more interfering beams as the one or more beams received by the mobile device 104 having the strongest interfering signal (or signals).

Thus, in one embodiment, the mobile device can transmit in the CRI provided as CSI feedback, information (e.g., index identifying a BS device) for at least one beam and information (e.g., index identifying a BS device) for at least one interfering beam. In other embodiments, beams of multiple BS devices can be selected and/or interfering beams of multiple BS device can be identified and placed in the CRI provided as CSI feedback also.

The mobile device 104 can also include, with the CRI, in various embodiments, one or more of the CQI, PMI, advanced PMI and/or RI. The PMI, advanced PMI and RI can be selected to coincide with the BS device for which the transmission beam was selected and the index for which was transmitted via the CRI. The CQI can be computed based on the one or more selected beams and the one or more interfering beams. For example, the CQI can be associated with the signal to noise interference ratio employing the one or more selected beams and the one or more interfering beams. The PMI, advanced PMI and/or RI can be selected by the mobile device 104 such that these correspond to the one or more BS devices selected for transmission by the mobile device 104 (e.g., the one or more strongest beams).

In some embodiments, the mobile device 104 can identify the selected beams by including an index associated with the BS device (in lieu of providing a more extensive identifier or the like). Similar to identification of the BS devices in the CRI, the mobile device 104 can employ one or more indexes to indicate the selected PMI, selected advanced PMI, selected RI and/or particular CQI to provide for a more efficient transmission of CRI.

To support interference measurements, CSI-IM configurations (e.g., a set of resource elements the mobile device 104 uses to measure interference) can be employed. The configuration of CSI-IM resources can be similar to CSI resources, and can be covered by Zero Power (ZP)-CSI-RS, which are resources in which the neighboring interfering cells are assumed to be non-transmitting, or non-zero-power (NZP)-CSI-RS resources, where the neighboring BS devices are transmitting.

As an enhancement on LTE Multiple Input Multiple Output (MIMO) embodiments, two types of CSI feedback can be provided. Type I feedback is codebook-based PMI feedback with normal spatial resolution while Type II feedback is enhanced explicit feedback and/or codebook-based feedback with higher spatial resolution. Either embodiment can be employed in the embodiments described herein.

In one or more embodiments, in lieu of configuring the CSI feedback type via the network, the mobile device 104 provides information for such configuration. Since the network does not measure the channel directly, having the network provide the configuration is less efficient than deciding by mobile device 104. Given that the mobile device 104 measures the channel directly, the mobile device 104 is in a better position to indicate to the network the resource corresponding to the desired signal, the interfering signal, and the combination thereof that results in the transmission scheme that minimizes the interference towards that mobile device 104.

Also, in one or more embodiments described herein, more than one reference signal resource indication feedback can be provided from the mobile device 104 in the CSI resource indexes report. This gives the mobile device 104 further flexibility to signal to the network the resource indexes corresponding to the desired BS device signal and interfering BS device signals.

One or more embodiments can allow the mobile device 104 to have significant flexibility in choosing the CSI feedback. One or more embodiments described herein can be high efficiency since the mobile device 104 can directly measure the channel. Such mobile device 104 flexibility can be applicable not only for conventional interference scenarios, arising in MIMO scenarios but also for interference scenarios such as cross-link interference arising in dynamic time division duplexing (TDD), as well as multi-hop over the air backhaul, among other applications. This framework can also be applied to help the BS device decide on the coordinated multi-point (CoMP) scheme, such that the mobile device 104 has better visibility on the measured signals and interference, and it can report back to the network so that the network can decide whether to do joint transmission (JT) or dynamic point selection (DPS) or neither.

As shown in FIG. 1, the CSI report can be sent from the mobile device 104 to the BS device 102 via a feedback channel. The BS device 102 scheduler can use this information in choosing the parameters for scheduling of the particular mobile device 104. As used herein, the term "BS device: 102 can be interchangeable with (or include) a network, a network controller or any number of other network components. The BS device 102 can send the scheduling parameters and/or resource allocation information (along with a reference signal) to the mobile device 104 in the downlink control channel (e.g., downlink control channel 110). After this information is transmitted, in some embodiments, the downlink data traffic channel can be transmitted from the BS device 102 to the mobile device 104.

Figure 2:
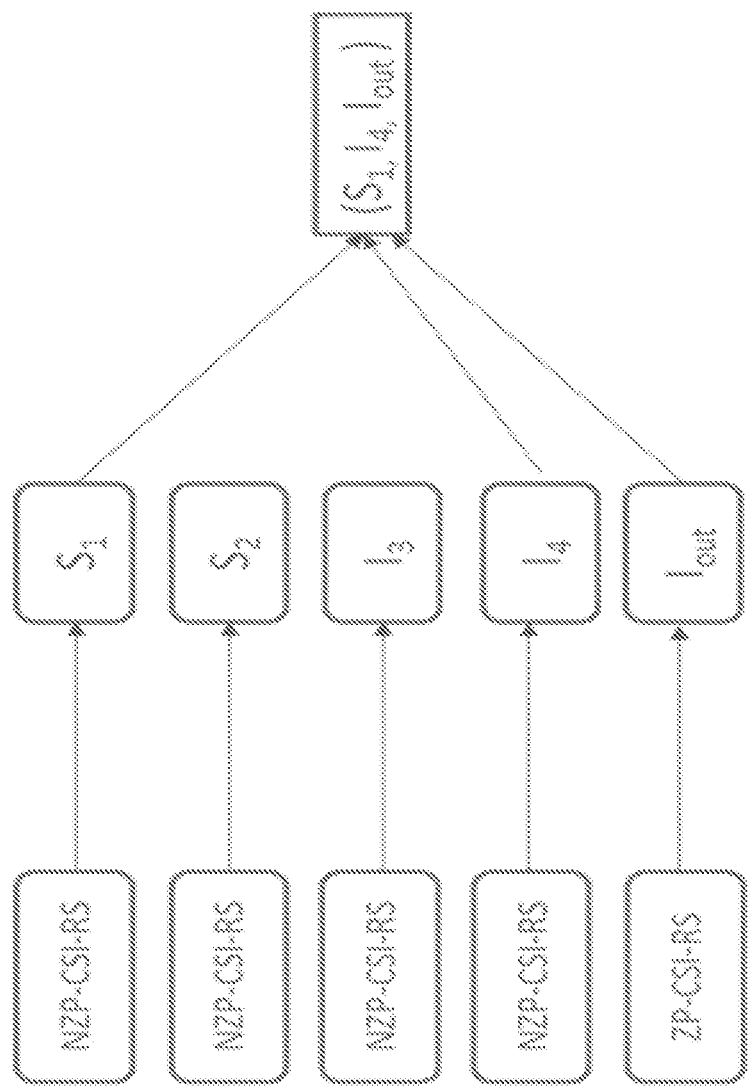
FIG. 2 illustrates an example, non-limiting diagram of a framework illustrating channel state information (CSI) resources measurement and reporting at the mobile device for an enhanced resource indicator for channel state reporting in accordance with one or more embodiments described herein.

FIG. 2 illustrates an example, non-limiting diagram of a framework illustrating channel state information (CSI) resources measurement and reporting at the mobile device for an enhanced resource indicator for channel state reporting in accordance with one or more embodiments described herein. Repetitive description of like elements employed in other embodiments described herein is omitted for sake of brevity.

Shown in FIG. 2, in the embodiments shown, the CSI report transmitted by the mobile device 104 can be enhanced to include a report including a selected a subset K of measured resources such that this subset includes indexes corresponding to one or multiple desired signal (e.g., beam) transmissions and one or multiple interfering signal (e.g., beam) transmissions chosen from a set N of signals (e.g., beams, resources) at the mobile device 104.

In particular, the subset K of resource indexes reported by the mobile device 104 can indicate the one or more desired signals/beams corresponding to one or more base station devices (e.g., BS device 102, 104, 106) the one or more signals corresponding to one or more strongest interfering neighboring BS devices. The mobile device 104 can report the selection as CRI (CSI-RS Resource Indicator), which selects one or more CSI-RS resources for signal and interference measurement.

When a CSI-RS resource is selected as signal by the mobile device 104, the BS device 102 transmitting that CSI-RS resource is selected as the preferred BS device 102 to transmit data to this mobile device 104. When a CSI-RS resource is selected as an interference source by the mobile device 104, the BS device 102 transmitting that CSI-RS resource is selected as the strongest interference source to this mobile device 104.

With the reported CRI, the mobile device 104 can also report the PMIs and/or CQ based on the selected CSI-RS resources. The PMIs can be reported corresponding to the PMI of the selected CSI-RS resource, either as a desired signal or interference. For interference CSI-RS resource, the PMI set that results in the worst interference at the mobile device 104 from the strongest interferers indexes reported in CRI. The CQI report can assume the best beam and best interference direction was used at the BS device 102, respectively, the interfering neighboring BS devices.

This is further illustrated in the example given in FIG. 2 where the mobile device 104 is configured to measure CSI-RS resources corresponding to two desired signals ($gNB_1$, $gNB_2$), two interfering signals ($gNB_3$, $gNB_4$), in addition to the interference assumed coming from outside the coordination area, (when the considered neighboring gNBs are not transmitting), $I_{out}$, measured at the mobile device by ZP-CSI-RS. Out of this set of N=5 CSI-RS resources, the mobile device 104 reports CRI to indicate its selection on CSI-RS resource for both signal and interference. In the example, it chooses to report a subset K=3 resource indexes, corresponding to the desired signal $S_1$ ($gNB_1$), the interfering signal $I_4$ ($gNB_4$) and the interference $I_{out}$ measured by ZP-CSI-RS.

The interfering signal from gNB4 is reported by the mobile device to the network, because it is measured by the mobile device to be the strongest interferer (among measured interferers). This report of the subset of resources is joined by a PMI report and a CQI report. This is illustrated for the example above in FIG. 3.

Figure 3:
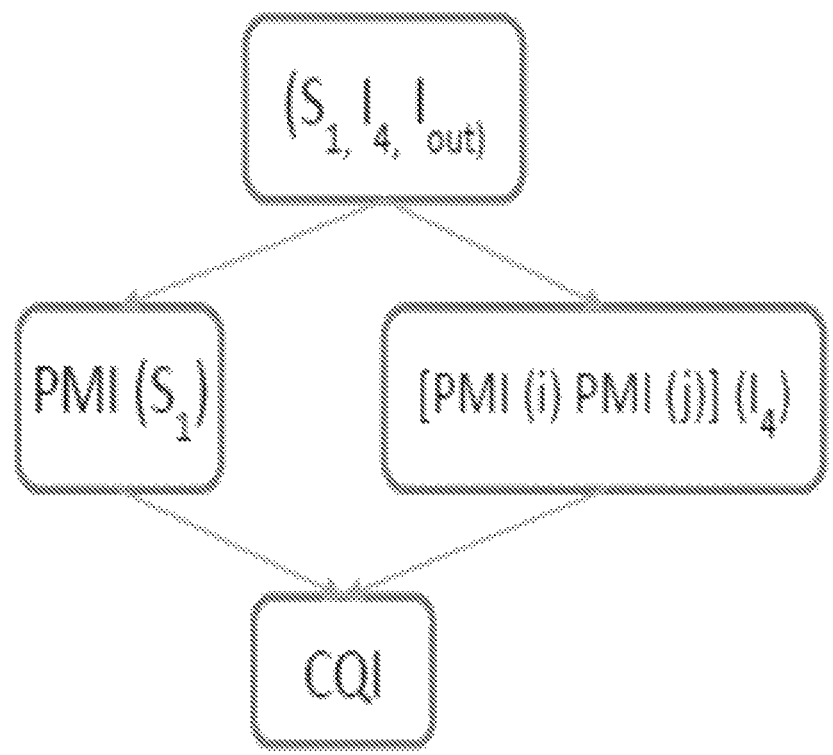
FIG. 3 illustrates an example, non-limiting diagram of a CSI report configured at the mobile device facilitating an enhanced resource indicator for channel state reporting in accordance with one or more embodiments described herein.

FIG. 3 illustrates an example, non-limiting diagram of a CSI report configured at the mobile device facilitating an enhanced resource indicator for channel state reporting in accordance with one or more embodiments described herein. Repetitive description of like elements employed in other embodiments described herein is omitted for sake of brevity.

As shown in FIG. 3, the set of mobile device selected resource indexes reported back to the network can be joined by a PMI report that indicates the preferred precoder to use for downlink transmission by the desired signal (PMI (S1)). Note that the preferred precoder need not be explicitly indicated to the network, but its index can be chosen from a set of previously defined matrices forming a codebook fed back to the network, where the same codebook of these previously defined matrices is available at both the mobile device and the network.

The PMI report can also include the indexes of precoders of the strongest interferer (gNB4). Here the number of indexes of precoders of the strongest interferer is configurable (at least 1 but can be larger than 1), and these indexes given by [PMI (i), PMI (j)] in the example in FIG. 3, correspond to the precoders at gNB4 that result in the worst interference to the mobile device. As an example, consider that the codebook from which the PMIs corresponding to the predefined matrices are chosen consists of 4 predefined matrices (codebook size=4), then the possible PMIs that can be fed back are 4 [PMI1, PMI2, PMI3, PMI4]. If the mobile device feeds back [PMIi, PMIj]=[PMI2, PMI3], these correspond to the precoders at gNB4 that result in the worst interference to the mobile device, relative to other precoders in the codebook. It is to be understood that the number of PMIs reported (e.g., 2 in this example) is not limited to 2, and can be any number.

The CQI report illustrated in FIG. 3, corresponds to the signal to interference plus noise ratio calculated such that the best beam (precoder) is assumed at the desired $gNB_1$, and the least interfering beam (precoder) is assumed at $gNB_4$, in addition to $I_{out}$. For the example in paragraph noted above, this corresponds to PMI1 or PMI4, depending on which corresponding precoder provides the least interference to the mobile device. The example above illustrates the case when the mobile device 104 reports on one serving gNB, the mobile device can also use the described generic resource indicator to report on the signals from two transmitting gNBs (e.g. gNB1, and gNB2), such that gNB1 and gNB2 can coordinate their transmissions towards the mobile device, in a Dynamic Point Selection (DPS) or a joint transmission (JT) coordinated multi-point (CoMP) scenario.

The example above also does not preclude other use cases for this generic resource indicator for CSI framework, such as reporting on cross-link interference in a dynamic time division duplex (TDD) scenario, and backhaul interference in a integrated access and backhaul scenario.

The report can further be used at the mobile device to choose among the measured CSI-RS from different gNBs who is the serving BS device and who is the interfering BS device, and report this subset to the network.

Figure 4:
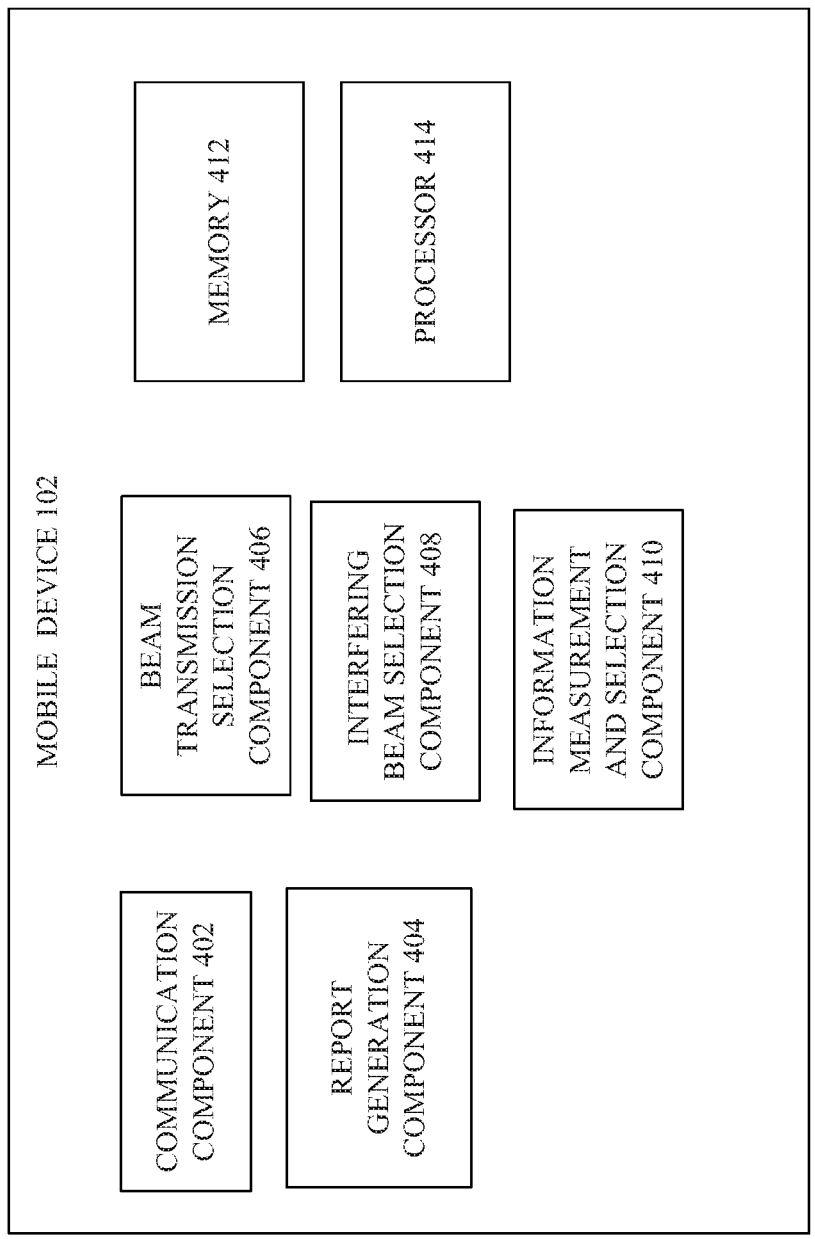
FIG. 4 illustrates an example, non-limiting block diagram of a mobile device for which an enhanced resource indicator for channel state reporting can be facilitated in accordance with one or more embodiments described herein.

FIG. 4 illustrates an example, non-limiting block diagram of a mobile device for which an enhanced resource indicator for channel state reporting can be facilitated in accordance with one or more embodiments described herein. Repetitive description of like elements employed in other embodiments described herein is omitted for sake of brevity.

Mobile device 102 can comprise communication component 402, report generation component 404, beam transmission selection component 406, interfering beam selection component 408, information measurement and selection component 410, memory 411 and/or processor 414. In various embodiments, one or more of the communication component 402, report generation component 404, beam transmission selection component 406, interfering beam selection component 408, information measurement and selection component 410, memory 411 and/or processor 414 can be electrically and/or communicatively coupled to one another to perform one or more functions of mobile device 102.

The communication component 402 can receive one or more signals from one or more BS devices. The communication component 402 can also transmit the CSI as feedback on the uplink from the mobile device 102. The report generation component 404 can generate report data indicative of one or more indexes identifying beams (identified by beam transmission selection component 406) and/or interfering beams (identified by interfering beam selection component 408) for the mobile device. The report data can also include PMI, CQI and other information as selected by the information measurement and selection component 410. The memory 412 can store instructions that can be executed by processor 414 to select one or more beams, one or more interfering beams, identify PMI and/or CQI and/or provide a report and/or generate indexes corresponding to particular BS devices.

Figure 5:
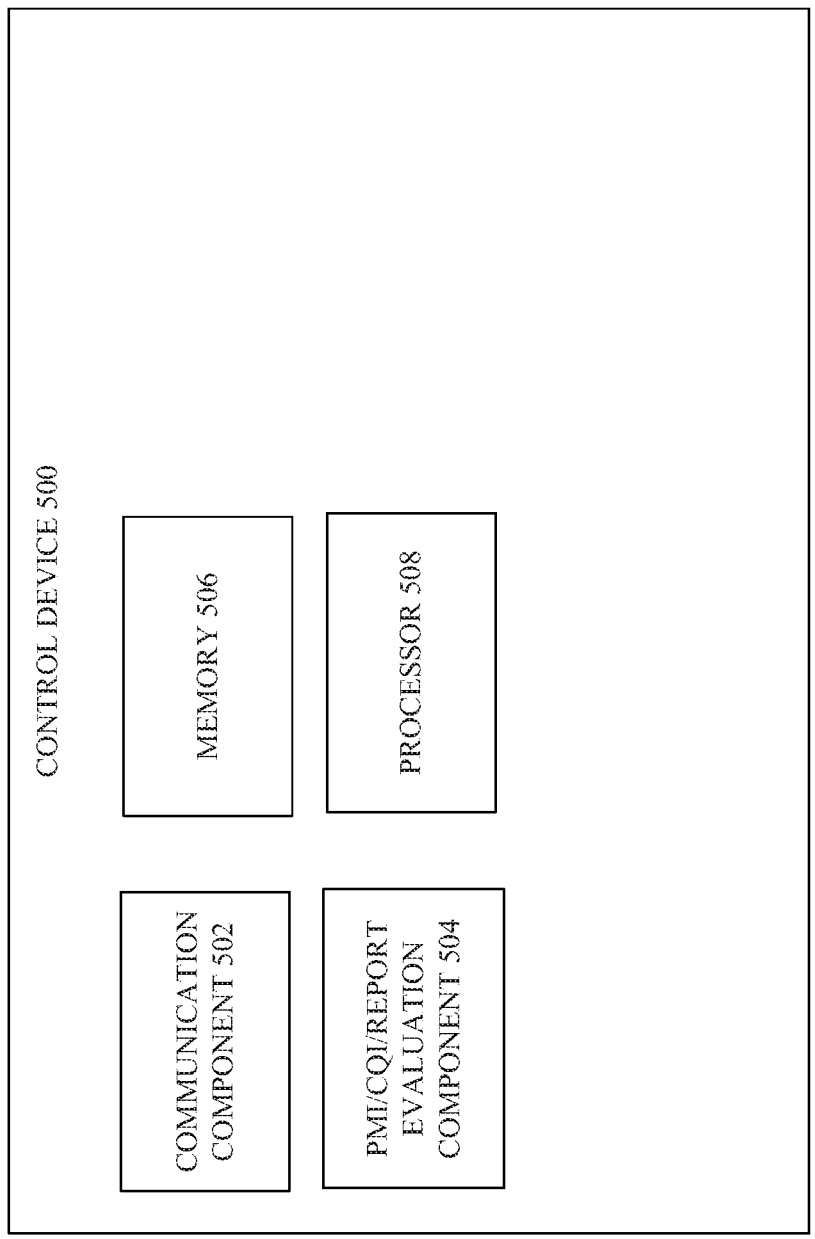
FIG. 5 illustrates an example, non-limiting block diagram of a control device facilitating an enhanced resource indicator for channel state reporting in accordance with one or more embodiments described herein.

FIG. 5 illustrates an example, non-limiting block diagram of a control device facilitating an enhanced resource indicator for channel state reporting in accordance with one or more embodiments described herein. Repetitive description of like elements employed in other embodiments described herein is omitted for sake of brevity.

The control device can be the BS device 102 in some embodiments. In other embodiments, the control device can be a network device communicatively coupled to the BS device 102. The communication component 502 can transmit one or more signals and/or receive CSI feedback from the mobile device 104. The communication component 502 can transmit the report from the mobile device 104 to the network and/or transmit a beam or change the channel parameters for transmission if the BS device is indicated as transmitting a signal that is preferred for receipt by the mobile device 104 and/or BS device is indicated as an interfering BS device. The PMI/CQI/Report Evaluation Component 504 can evaluate the CSI information received via the report. The memory 506 can store instructions that can be executed by processor 508 to transmit one or more beams, forgo transmission of one or more interfering beams, identify PMI and/or CQI and/or evaluate the report and/or indexes corresponding to particular BS devices.

FIGS. 6, 7, 8 and 9 illustrate flowcharts of methods facilitating an enhanced resource indicator for channel state reporting in accordance with one or more embodiments described herein. Repetitive description of like elements employed in other embodiments described herein is omitted for sake of brevity.

Figure 6:
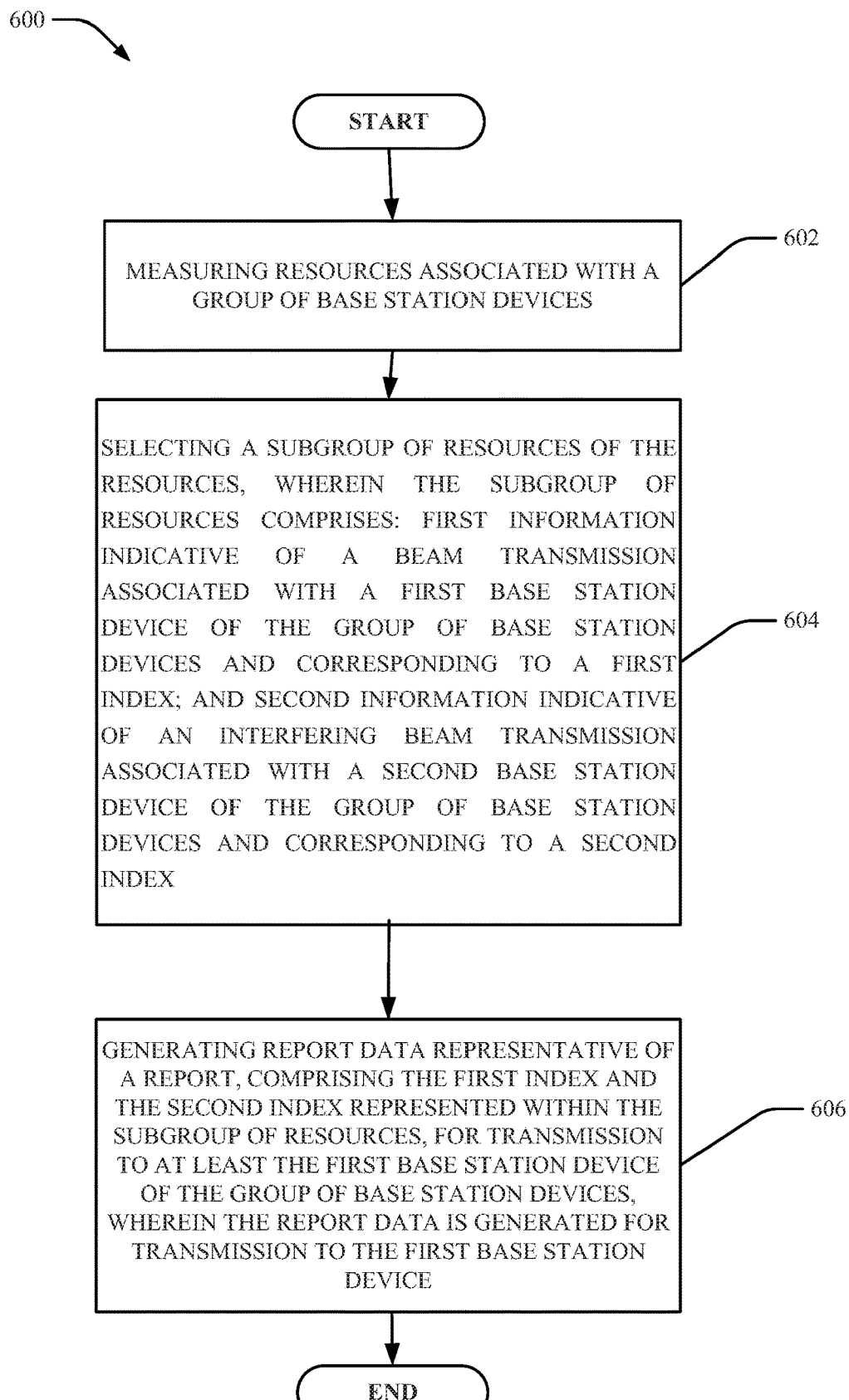
FIGS. 6, 7, 8 and 9 illustrate flowcharts of methods facilitating an enhanced resource indicator for channel state reporting in accordance with one or more embodiments described herein.

Turning first to FIG. 6, at 602, method 600 can comprise measuring resources associated with a group of base station devices. At 604, method 600 can comprise selecting a subgroup of resources of the resources, wherein the subgroup of resources comprises: first information indicative of a beam transmission associated with a first base station device of the group of base station devices and corresponding to a first index; and second information indicative of an interfering beam transmission associated with a second base station device of the group of base station devices and corresponding to a second index. In some embodiments, selecting the subgroup of resources further comprises selecting third information indicative of a second beam transmission associated with a third base station device of the group of base station devices and corresponding to a third index.

At 606, method 600 can comprise generating report data representative of a report, comprising the first index and the second index represented within the subgroup of resources, for transmission to at least the first base station device of the group of base station devices, wherein the report data is generated for transmission to the first base station device. In some embodiments, generating the report data comprises including, in the report data, information indicative of interference originating from outside a coordination area of the apparatus at a time when the group of base station devices are determined not to be transmitting to the apparatus. In some embodiments, generating the report comprises: including, in the report data, channel quality information indicative of signal to interference plus noise ratio determined based on the beam transmission and the interfering beam transmission.

In some embodiments, the beam transmission is a strongest beam transmission received at the apparatus, wherein the interfering beam transmission is a strongest interfering beam received at the apparatus, and wherein the first base station device and the second base station device are different.

Figure 7:
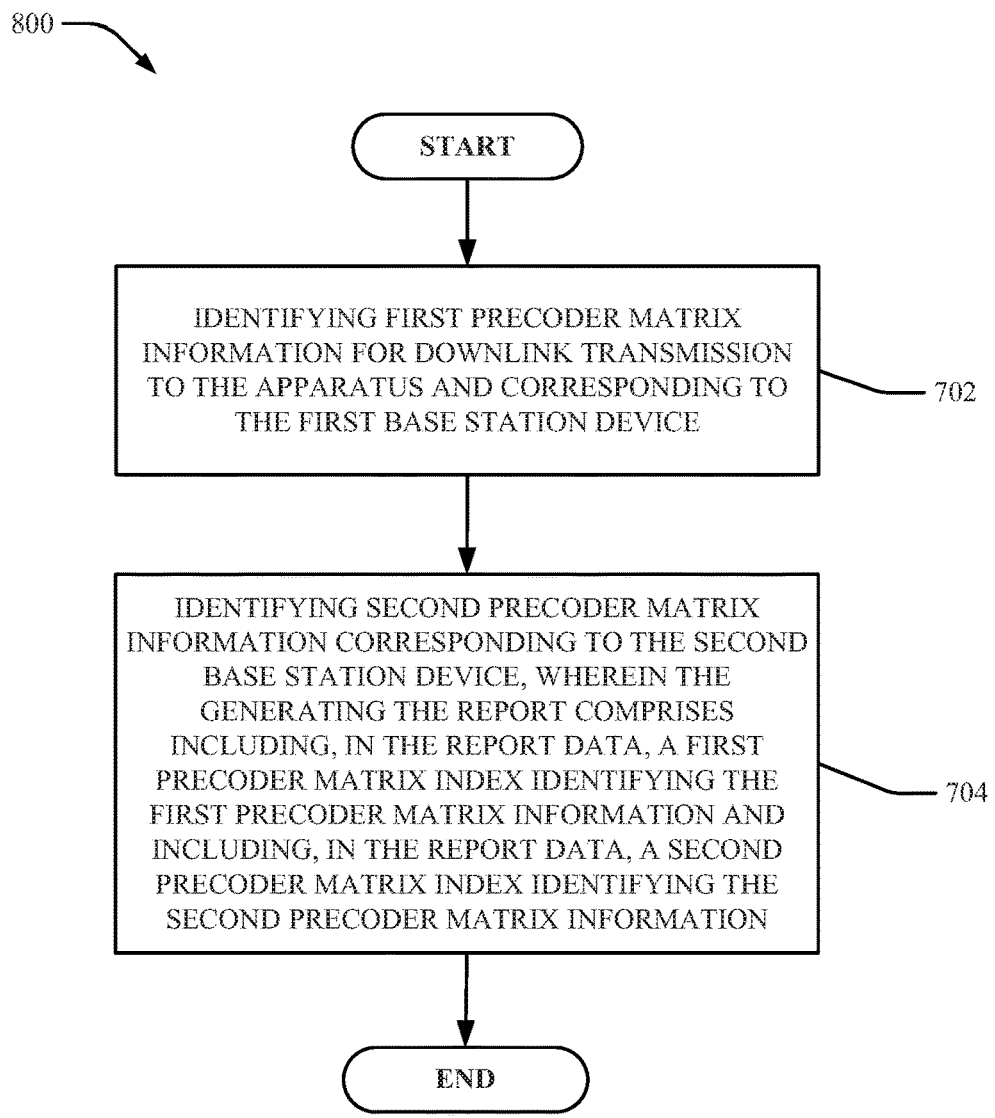

Turning now to FIG. 7, at 702, method 700 can comprise identifying first precoder matrix information for downlink transmission to the apparatus and corresponding to the first base station device. At 704, method 700 can comprise identifying second precoder matrix information corresponding to the second base station device, wherein the generating the report comprises including, in the report data, a first precoder matrix index identifying the first precoder matrix information and including, in the report data, a second precoder matrix index identifying the second precoder matrix information.

In some embodiments, the first base station device and the third base station device are configured to provide downlink transmission to the apparatus according to a coordinated, alternating protocol.

Figure 8:
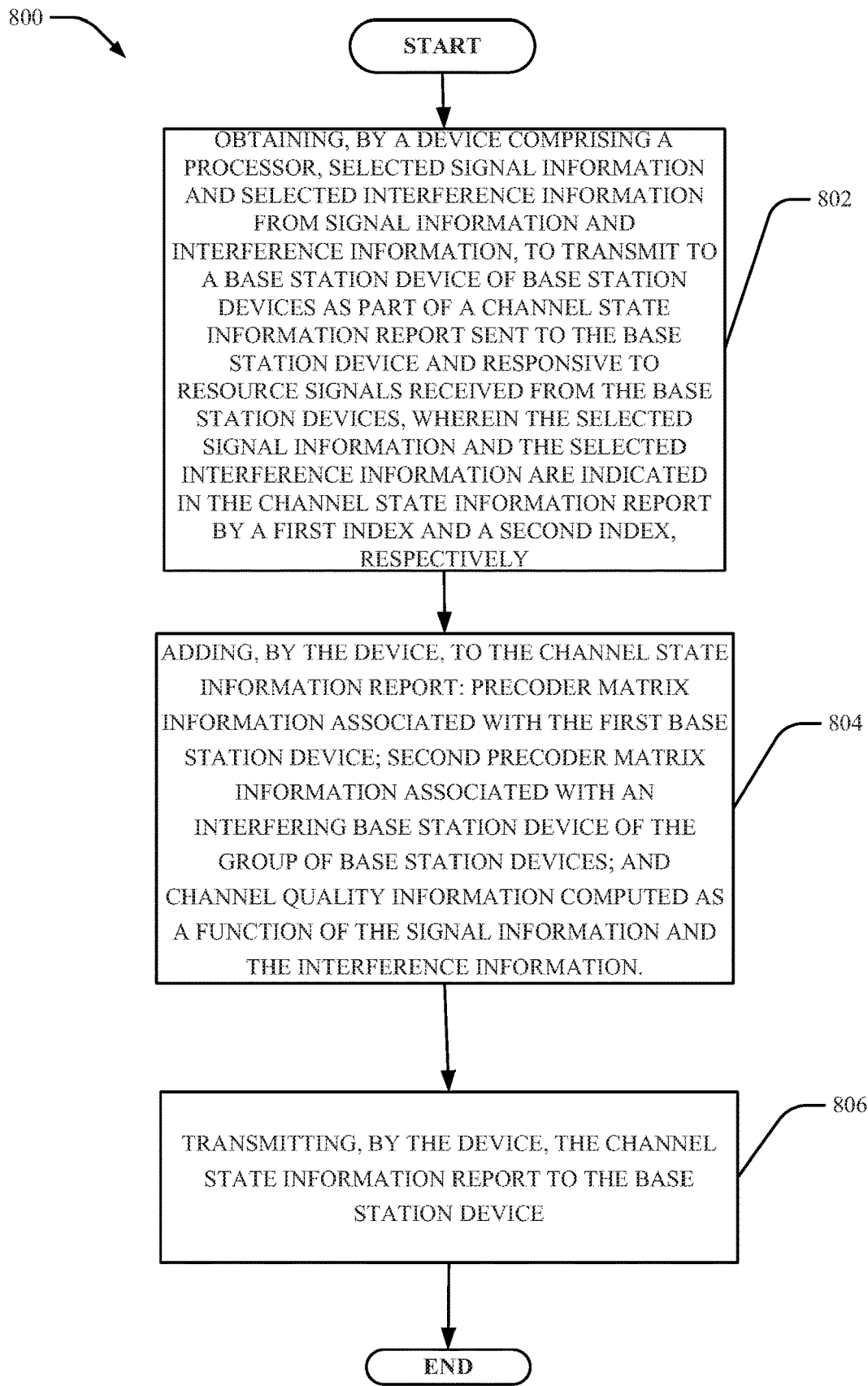

Turning now to FIG. 8, at 802, method 800 can comprise obtaining, by a device comprising a processor, selected signal information and selected interference information from signal information and interference information, to transmit to a base station device of base station devices as part of a channel state information report sent to the base station device and responsive to resource signals received from the base station devices, wherein the selected signal information and the selected interference information are indicated in the channel state information report by a first index and a second index, respectively.

At 804, method 800 can also comprise adding, by the device, to the channel state information report: precoder matrix information associated with the first base station device; second precoder matrix information associated with an interfering base station device of the group of base station devices; and channel quality information computed as a function of the signal information and the interference information.

At 806, method 800 can comprise transmitting, by the device, the channel state information report to the base station device.

Figure 9:
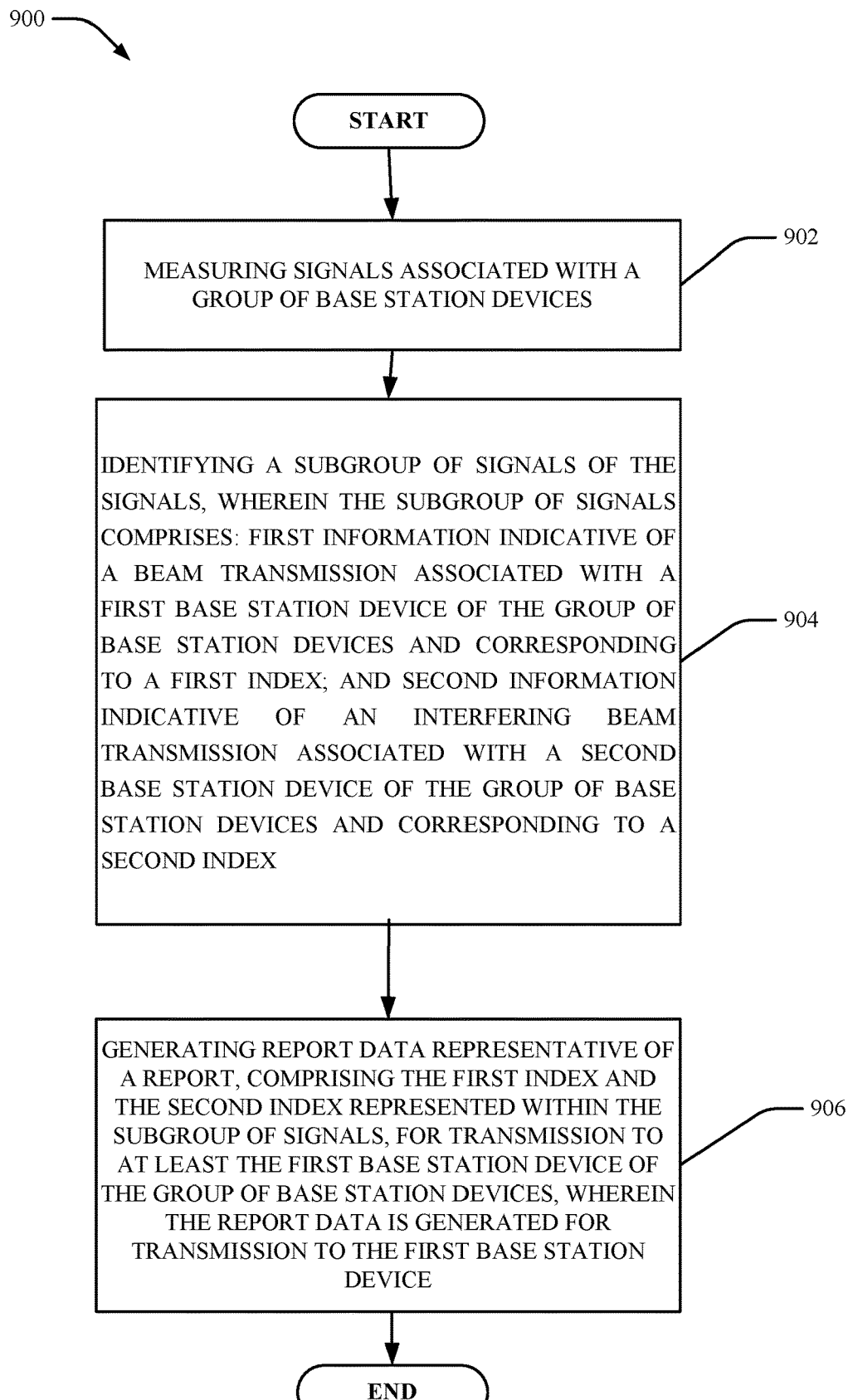

Turning now to FIG. 9, at 902, method 900 can comprise measuring signals associated with a group of base station devices. At 904, method 900 can comprise identifying a subgroup of signals of the signals, wherein the subgroup of signals comprises: first information indicative of a beam transmission associated with a first base station device of the group of base station devices and corresponding to a first index; and second information indicative of an interfering beam transmission associated with a second base station device of the group of base station devices and corresponding to a second index. At 906, method 900 can comprise generating report data representative of a report, comprising the first index and the second index represented within the subgroup of signals, for transmission to at least the first base station device of the group of base station devices, wherein the report data is generated for transmission to the first base station device.

Figure 10:
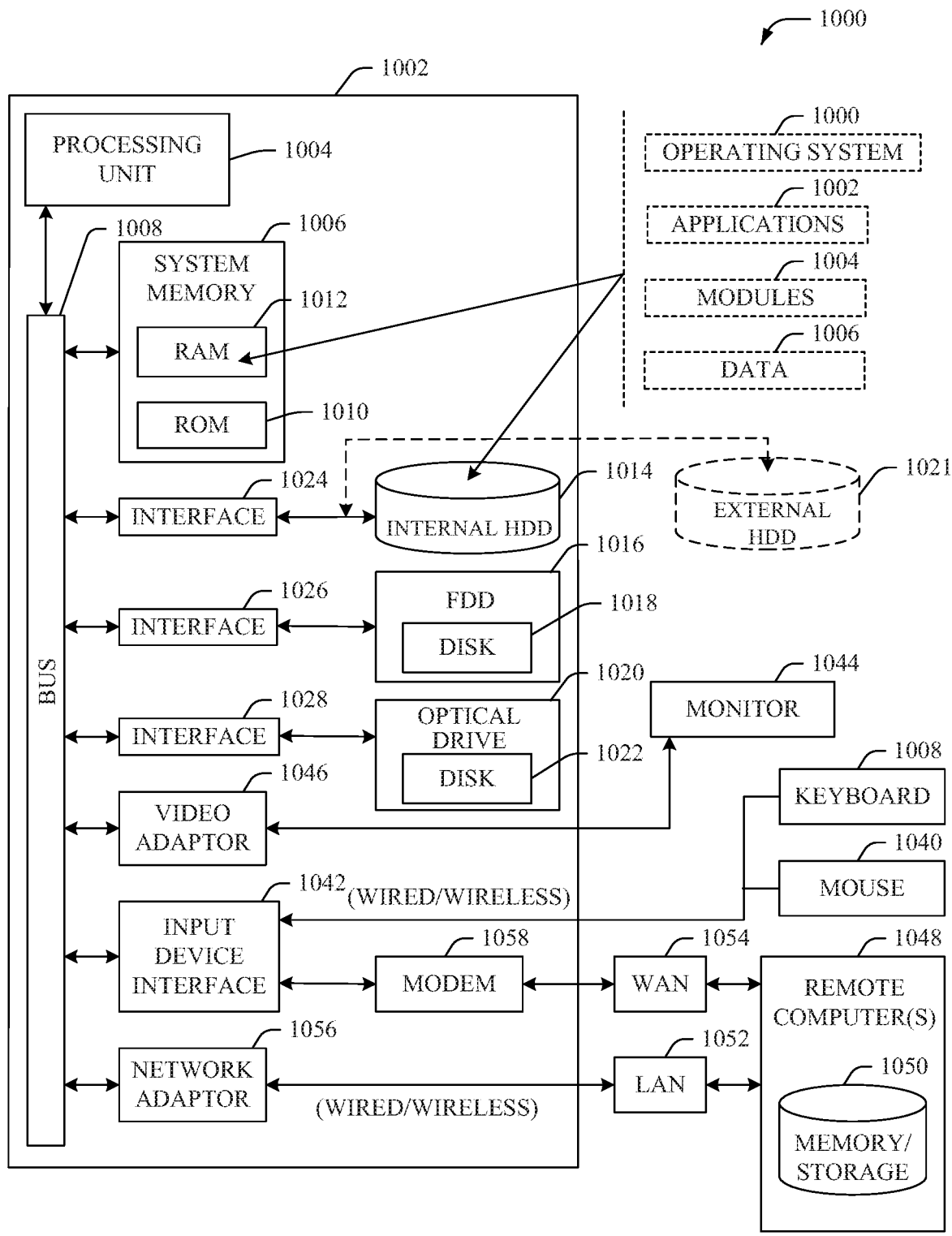
FIG. 10 illustrates a block diagram of a computer that can be employed in accordance with one or more embodiments described herein.

FIG. 10 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, base station device 102 or mobile device 104 (or a component of base station device 102 or mobile device 104).

In order to provide additional text for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment 1000 for implementing various embodiments of the embodiments described herein comprises a computer 1002, the computer 1002 comprising a processing unit 1004, a system memory 1006 and a system bus 1008. The system bus 1008 couples system components comprising, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1010 (e.g., EIDE, SATA), which internal hard disk drive 1014 can also be configured for external use in a suitable chassis (not shown), a magnetic floppy disk drive 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface, respectively. The interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A communication device can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also comprise a wireless AP disposed thereon for communicating with the wireless adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data.

Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
    a processor; and
    a memory that stores executable instructions that, when executed by the processor, facilitate performance of operations, comprising:
    selecting a subgroup of resources, wherein the resources are associated with a group of base station devices, and wherein the subgroup of the resources comprises:
        first information indicative of a first beam transmission associated with a first base station device of the group of base station devices and corresponding to a first index; and
        second information indicative of a second beam transmission associated with a second base station device of the group of base station devices and corresponding to a second index; and
    generating report data representative of a report comprising the first index and the second index represented within the subgroup of the resources.

2. The apparatus of claim 1, wherein the generating the report data comprises including, in the report data, third information indicative of an interfering beam transmission originating from outside of a coordination area of the apparatus at a time when the group of base station devices has been determined not to be transmitting to the apparatus.

3. The apparatus of claim 2, wherein the first beam transmission is a strongest beam transmission received at the apparatus, wherein the interfering beam transmission is a strongest interfering beam received at the apparatus, and wherein the first base station device and the second base station device are different.

4. The apparatus of claim 2, wherein the generating the report comprises:
    including, in the report data, channel quality information indicative of a signal to interference plus noise ratio determined based on the first beam transmission and the interfering beam transmission.

5. The apparatus of claim 1, wherein the operations further comprise:
    identifying first precoder matrix information for inclusion in a downlink transmission to the apparatus and corresponding to the first base station device; and
    identifying second precoder matrix information corresponding to the second base station device, wherein the generating the report comprises including, in the report data, a first precoder matrix index identifying the first precoder matrix information and including, in the report data, a second precoder matrix index identifying the second precoder matrix information.

6. The apparatus of claim 1, wherein the selecting the subgroup of the resources further comprises selecting third information indicative of a third beam transmission associated with a third base station device of the group of base station devices and corresponding to a third index.

7. The apparatus of claim 6, wherein the first base station device and the third base station device are configured to send a downlink transmission to the apparatus according to a coordinated, alternating protocol.

8. A method, comprising:
    selecting, by a device comprising a processor, a subgroup of resources, wherein the resources are associated with a group of base station devices, and wherein the subgroup of the resources comprises:
        first information indicative of a first beam transmission associated with a first base station device of the group of base station devices, the first information corresponding to a first index; and
        second information indicative of a second beam transmission associated with a second base station device of the group of base station devices, the second information corresponding to a second index; and
    determining, by the device, report data associated with the first index and the second index represented within the first information and the second information of the subgroup of the resources.

9. The method of claim 8, wherein the determining the report data comprises including, in the report data, third information indicative of an interfering beam transmission originating from outside of a coordination area of the device at a time when the group of base station devices has been determined not to be transmitting to the device.

10. The method of claim 9, wherein the first beam transmission is a strongest beam transmission received at the device.

11. The method of claim 9, wherein the interfering beam transmission is a strongest interfering beam received at the device.

12. The method of claim 9, wherein the generating the report comprises:
    including, by the device and in the report data, channel quality information indicative of a signal to interference plus noise ratio determined based on the first beam transmission and the interfering beam transmission.

13. The method of claim 8, wherein the first base station device and the second base station device are different.

14. The method of claim 8, further comprising:
    identifying, by the device, first precoder matrix information for inclusion in a downlink transmission to the device and corresponding to the first base station device.

15. The method of claim 14, further comprising:
    identifying, by the device, second precoder matrix information corresponding to the second base station device, wherein the generating the report comprises including, in the report data, a first precoder matrix index identifying the first precoder matrix information and including, in the report data, a second precoder matrix index identifying the second precoder matrix information.

16. The method of claim 8, further comprising:
    receiving, by the device, a downlink transmission from the first base station device and the third base station device that were transmitted according to a coordinated, alternating protocol.

17. The method of claim 8, further comprising:
receiving, by the device, a downlink transmission from the first base station device and the third base station device that were transmitted according to a coordinated, alternating protocol.

18. A non-transitory machine-readable storage medium, comprising executable instructions that, when executed by a processor of a device, facilitate performance of operations, comprising:
selecting a subgroup of resources, wherein the resources are associated with a group of base station devices, and wherein the subgroup of the resources comprises:
first information indicative of a first beam transmission associated with a first base station device of the group of base station devices and corresponding to a first index; and
second information indicative of a second beam transmission associated with a second base station device of the group of base station devices and corresponding to a second index; and
generating data representative of a report comprising the first index and the second index represented within the subgroup of the resources.

19. The non-transitory machine-readable storage medium of claim 17, wherein the generating the data comprises including, in the data, third information indicative of an interfering beam transmission originating from outside of a coordination area of the device at a time when the group of base station devices has been determined not to be transmitting to the device.

20. The non-transitory machine-readable storage medium of claim 17, wherein the first beam transmission is a strongest beam transmission received at the device, wherein the interfering beam transmission is a strongest interfering beam received at the device, and wherein the first base station device and the second base station device are different.

* * * * *